(12) United States Patent
Fujimaki et al.

(10) Patent No.: US 7,488,440 B2
(45) Date of Patent: Feb. 10, 2009

(54) FRICTION MATERIAL AND ITS MANUFACTURING METHOD

(75) Inventors: Yoshihito Fujimaki, Nishikamo-gun (JP); Yuko Higashijima, Nagoya (JP)

(73) Assignee: Aisin Kako Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 11/393,950

(22) Filed: Mar. 31, 2006

(65) Prior Publication Data

US 2006/0169403 A1    Aug. 3, 2006

Related U.S. Application Data

(62) Division of application No. 10/730,249, filed on Dec. 9, 2003, now Pat. No. 7,051,858.

(30) Foreign Application Priority Data

Dec. 9, 2003   (JP) ............... 2002-357094
Dec. 9, 2003   (JP) ............... 2003-410009

(51) Int. Cl.
*B28B 1/20* (2006.01)
(52) U.S. Cl. .................. 264/311; 192/107 M
(58) Field of Classification Search ............ 192/107 R, 192/107 M; 106/36; 188/251 A; 264/311, 264/319, 340, 346, 348; 428/66.2; 523/152, 523/156, 157; 7/158
See application file for complete search history.

(56) References Cited

U.S. PATENT DOCUMENTS

| 2,196,569 | A |   | 4/1940  | Stroehla et al. |         |
|-----------|---|---|---------|-----------------|---------|
| 2,277,602 | A |   | 3/1942  | Novak           |         |
| 2,578,457 | A |   | 12/1951 | Somers          |         |
| 3,290,423 | A |   | 12/1966 | Hatch et al.    |         |
| 3,956,545 | A | * | 5/1976  | Afflerbach et al. | 428/37  |
| 4,118,528 | A | * | 10/1978 | Lowry           | 428/66.2 |
| 4,663,368 | A | * | 5/1987  | Harding et al.  | 523/155 |
| 4,874,564 | A |   | 10/1989 | Sudani et al.   |         |
| 5,823,314 | A |   | 10/1998 | Suzuki et al.   |         |
| 6,521,331 | B1|   | 2/2003  | Sikorski et al. |         |
| 6,544,632 | B2|   | 4/2003  | Umezawa et al.  |         |
| 6,776,276 | B2|   | 8/2004  | Okamura et al.  |         |

(Continued)

FOREIGN PATENT DOCUMENTS

JP         05-99297 A       4/1993

*Primary Examiner*—Rodney H Bonck
(74) *Attorney, Agent, or Firm*—Westerman, Hattori, Daniels & Adrian, LLP.

(57) ABSTRACT

A friction material has a resin amount distribution that is the largest at a portion near a non-friction surface, that becomes lower toward an inside and that is the lowest at a portion near a friction surface. For example, such friction material is manufacture as follows. First, two friction materials are overlapped while the friction surfaces faced with each other. Then, the friction materials are dried at a room temperature. At this time, the resin has such a characteristic as to move while dragged by a solvent that dries from the non-friction surface located outside. Using such characteristic, the resin amount at the portion near the friction surface is lessened. Then, a temperature at the friction surface is made low and a temperature at the non-friction surface is made high in a drying step of the friction material. Thereby, the resin amount at the portion near the friction surface is lessened.

3 Claims, 3 Drawing Sheets

U.S. PATENT DOCUMENTS

2002/0182407 A1 12/2002 Odani et al.
2004/0033341 A1 2/2004 Lam et al.
2005/0266170 A1* 12/2005 Nesbitt ................. 427/475

* cited by examiner

FRICTION MATERIAL AND ITS MANUFACTURING METHOD

RELATED APPLICATION

This application is a divisional application of U.S. patent application Ser. No. 10/730,249 filed on Dec. 9, 2003, which is hereby incorporated by reference in its entirety. Priority under 35 U.S.C. §§120 and 121 is hereby claimed for benefit of the filing ate of U.S. patent application Ser. No. 10/730, 249.

BACKGROUND OF THE INVENTION

1. Field of the Invention

This invention relates to a friction material for a friction clutch device that has a single friction plate or a plurality of friction plates for use in an automatic transmission of an automobile, a transmission of a motorcycle or the like, and to its manufacturing method.

2. Description of the Related Art

A wet friction clutch such as a multiplate clutch has one or a plurality of wet friction plates that are used in a lubricant. There are wet friction plates that are made of a sintered alloy, a carbon or a cork. Still, a paper wet friction plate is called as "a paper friction material" and is commonly used.

In manufacturing the paper wet friction material, a paper body is made of a substrate fiber such as a pulp or an aramid fiber and a filler such as a friction adjuster or a base filler. Next, the paper body is impregnated with a resin binder made of a thermosetting resin. Then, the paper body is heated to cure or harden the resin binder, thereby resulting in the paper wet friction material. Such paper wet friction material is advantageous because it is lightweight and cheap. Moreover, the paper wet friction material is made of a porous material and relatively rich in elasticity with resultant high oil absorbency. Furthermore, the paper wet friction material is excellent in heat resistance, abrasion resistance and the like.

A resin existing near a friction surface of the friction material is one of factors that determine the heat resistance (particularly a heat spot resistance) of the friction material. If an amount of the resin near the friction surface is large, the friction material becomes hard and the heat resistance is lowered. Thus, it is thought that it is desirable for the resin amount to be small.

However, if the total resin amount in the friction material is reduced so as to decrease the resin amount near the friction surface, it is impossible to maintain strength required for the friction material. Therefore, a minimum amount of resin is mixed into the friction material so as to balance the heat resistance and the strength.

Still, it is indispensable to remove the resin at the friction surface in order to achieve an ultrahigh heat resistance required for the friction material in these years. As a means to solve such problem, a post-treatment process such as a surface polishing or a high heat resin degradation (heat shearing) is added to improve the heat resistance.

However, if such post-treatment process is added, the costs increase. Moreover, there take place adverse effects in case of the post-treatment process. That is, if the surface polishing is adopted, the friction face of the friction material becomes rough or fuzzy so as to increase a drag torque. On other hand, if the heat shearing is adopted, even an inside of the friction material reaches a high temperature so as to cause deterioration of strength or the like. Thus, it is very hard at present to attain goals recently required for the friction material such as the low costs and the ultrahigh heat resistance.

BRIEF SUMMARY OF THE INVENTION

An object of the present invention is to provide a friction material at low costs that has an ultrahigh heat resistance without deterioration of strength and to provide a manufacturing method of such friction material.

According to a first aspect of the invention, there is provided a friction material comprising: a friction surface; a non-friction surface located opposite to the friction surface; and a resin contained in the friction material. A distribution of an amount of the resin in a thickness direction from a side of the friction surface to a side of the non-friction surface of the friction material is made lower at a portion near the friction surface than a portion having a highest amount of the resin in the thickness direction.

Therefore, the resin amount at the portion near the friction surface becomes lower than that of an inside of the friction material or the portion near the non-friction surface. Consequently, the friction material is improved very much in a heat resistance and a heat spot resistance, thereby becoming ultrahigh heart resistant. Moreover, a resin amount distribution in the thickness direction of the friction material is determined by a drying step of the friction material. Therefore, a post-treatment process is unnecessary. Consequently, the friction material can be ultrahigh heat resistant at low costs without deterioration of strength.

The amount of the resin of the friction material may be made about 5% or more lower at the side of the friction surface than at the side of the non-friction surface.

In this case, the resin amount becomes lower at the portion near the friction surface than at the portion near the non-friction surface.

The amount of the resin of the friction material may be made about 5% or more lower at the side of the friction surface than at an inside of the friction material.

In this case, the resin amount becomes lower at the portion near the friction surface than at the inside of the friction surface.

The distribution of the amount of the resin of the friction material may change in a continuous manner.

In this case, since the resin amount distribution changes continuously, no mechanical stress is concentrated on a specific part.

The distribution of the amount of the resin of the friction material may change in a discontinuous manner.

In this case, the resin amount distribution in the thickness direction can be determined by an overlapping. Consequently, the friction material is improved very much in the heat resistance and the heat spot resistance at desired low costs.

The distribution of the amount of the resin of the friction material may be formed by impregnation of the resin.

In this case, if a temperature at the friction surface is decreased and a temperature at the non-friction surface is increased in a drying step after the resin is impregnated, the resin in the friction material has such a characteristic as to move from a low temperature part to a high temperature part while led by a solvent that moves toward the high temperature part so as to be dried. Consequently, the resin amount distribution in the thickness direction becomes the highest at the portion near the non-friction surface and the lowest at the portion near the friction surface.

The distribution of the amount of the resin of the friction material may be made about 1% or more lower at the side of the friction surface than an average rate of the resin in the friction material.

In this case, the resin amount becomes lower at the portion near the friction surface than at the inside of the friction surface or at the portion near the non-friction surface.

The distribution of the amount of the resin may change two-dimensionally in a width direction and the thickness direction of the friction material when the friction material is cut along a largest length.

In this case, the friction material can obtain a mechanical strength corresponding to a load direction, thereby having stable strength.

The two-dimensional change in the distribution of the amount of the resin may be such that the distribution of the amount of the resin is made higher at an outer peripheral portion than at a central portion of the friction material.

In this case, the friction material can obtain a mechanical strength corresponding to a couple direction in which a load becomes large, thereby having stable strength.

According to a second aspect of the invention, there is provided a manufacturing method of a friction material comprising the steps of: making a resin contained in the friction material; and drying the friction material. The drying step includes a step for making low a temperature at one surface of the friction material and/or making high a temperature at another surface of the friction material.

Therefore, the resin in the friction material has such a characteristic as to move from a low temperature part to a high temperature part while led by a solvent that moves toward the high temperature part so as to be dried. Consequently, the resin amount distribution in the thickness direction becomes the lowest at the portion near the one surface. Thus, the friction material becomes ultrahigh heat resistant. Moreover, the manufacturing method forms a preferable resin amount distribution in the drying step that the conventional art adopts except a characteristic feature of the invention. Consequently, it is unnecessary to add steps, so that it can be practiced at low costs.

The drying step may further include a step for rotating the friction material in drying at a predetermined temperature condition so as to make a distribution of an amount of the resin higher at an outer peripheral portion of the friction material by a centrifugal force in rotating.

In this case, the friction material can obtain a mechanical strength corresponding to a couple direction in which a load becomes large, thereby having stable strength.

According to a third aspect of the invention, there is provided a manufacturing method of a friction material comprising the steps of: making a resin contained in the friction material; and drying the friction material. The drying step may include steps for drying two friction materials with friction surfaces thereof overlapped with each other and then hardening the friction materials at a high temperature while separating the friction materials or keeping the friction materials overlapped.

Therefore, a solvent does not dry from the friction surfaces that are faced with each other. Rather, the solvent dries from the non-friction surface that is located outside. Then, the resin in the friction material moves while dragged by the solvent. Thus, a resin amount distribution in a thickness direction becomes the highest at a portion near the non-friction surface and the lowest at the portion near the friction surface. Consequently, the friction material becomes ultrahigh heat resistant. Moreover, the manufacturing method forms a preferable resin amount distribution in the drying step that the conventional art adopts except a characteristic feature of the invention. Consequently, it is unnecessary to add steps, so that it can be practiced at low costs.

The drying step may further include a step for rotating the friction material in drying at a predetermined temperature condition so as to make a distribution of an amount of the resin higher at an outer peripheral portion of the friction material by a centrifugal force in rotating.

According to a fourth aspect of the invention, there is provided a manufacturing method of a friction material comprising the steps of: making two or more friction materials containing a different amount of a resin; and overlapping the friction materials so as to join the friction materials into one body before finishing drying of at least one of the friction materials containing the different amount of the resin.

Therefore, a plurality of friction materials that has a desired resin amount and that is dried appropriately are joined to make the resin amount distribution in the thickness direction the highest at the portion near the non-friction surface and the lowest at the portion near the friction surface. Thus, the friction material becomes ultrahigh heat resistant. For example, the friction materials are joined into one body during the drying step in which they are dried to a certain or appropriate degree.

The drying step may further include a step for rotating the friction material in drying at a predetermined temperature condition so as to make a distribution of an amount of the resin higher at an outer peripheral portion of the friction material by a centrifugal force in rotating.

According to a fifth aspect of the invention, there is provided a manufacturing method of a friction material comprising the steps of impregnating a resin in a friction material; and drying the friction material. The impregnating step includes a step for impregnating resins having different viscosities in a front surface and a rear surface of the friction material, and the drying step includes a step for drying the friction material at a predetermined temperature condition while locating downward a side of the friction material at which the resin having a larger viscosity is contained.

Therefore, in case the predetermined temperature condition and the viscosity have a certain relation, namely, in case the temperature is low and the viscosity is high, a resin amount distribution in a thickness direction from a friction surface side to a non-friction surface side of the friction material can be made lower at a portion near the friction surface than at a portion having a highest resin amount in the thickness direction.

The drying step may further include a step for rotating the friction material in drying at the predetermined temperature condition so as to make a distribution of an amount of the resin higher at an outer peripheral portion of the friction material by a centrifugal force in rotating.

According to a sixth aspect of the invention, there is provided a manufacturing method of a friction material comprising the steps of: impregnating a resin in a friction material; and drying the friction material. The impregnating step includes a step for impregnating an additional resin on one surface of the friction material, and the drying step includes a step for drying the friction material at a predetermined temperature condition while locating outside a side of the friction material in which the additional resin is impregnated and giving a centrifugal force to the friction material in a thickness of the friction material.

Therefore, a resin amount distribution in a thickness direction from a friction surface side, in which the additional resin is impregnated, to a non-friction surface side of the friction material can be made lower at a portion near the friction surface than at a portion having a highest resin amount in the thickness direction.

The drying step may further include a step for rotating the friction material in drying at the predetermined temperature condition so as to make a distribution of an amount of the resin higher at an outer peripheral portion of the friction material by a centrifugal force in rotating.

Further objects and advantages of the invention will be apparent from the following description, reference being had to the accompanying drawings, wherein preferred embodiments of the invention are clearly shown.

DETAILED DESCRIPTION OF THE INVENTION

One embodiment of the invention is described hereunder referring to FIG. 1 to FIG. 4.

Figure 1:
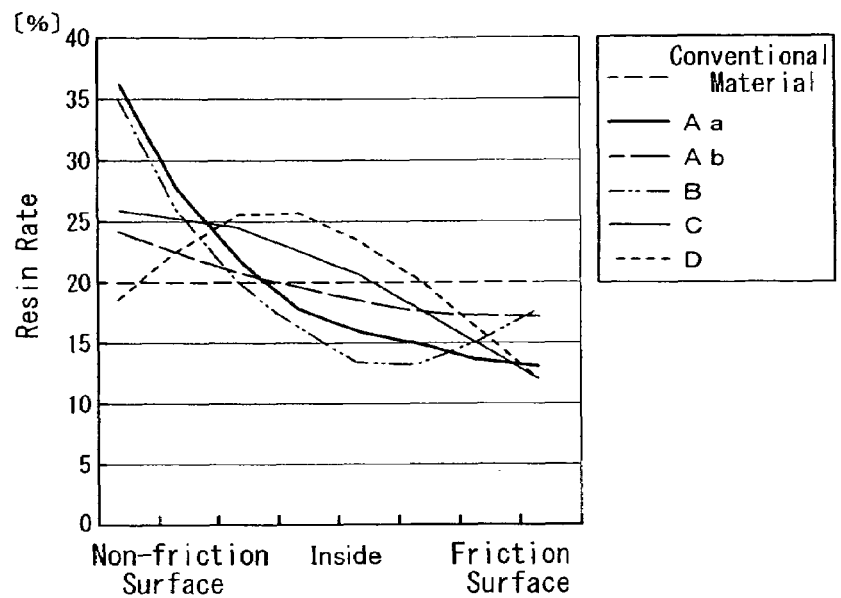
FIG. 1 is a graph showing a distribution of a resin amount in a thickness direction of a lining portion of a friction material unit according to an embodiment and its modifications of the invention.
Figure 2:
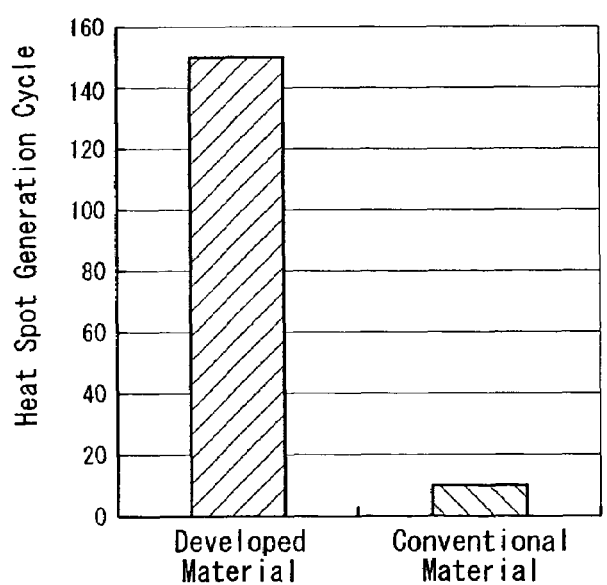
FIG. 2 is a graph comparing a heat spot resistance of the friction material according to the embodiment of the invention and that of a conventional material.
Figure 3:
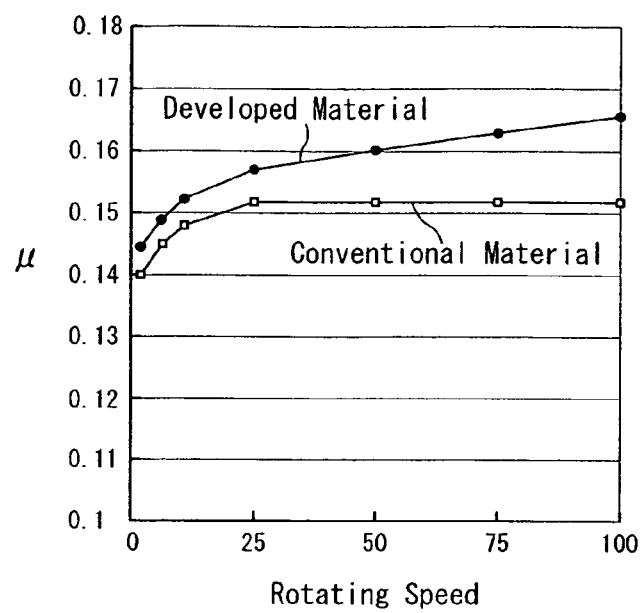
FIG. 3 is a graph comparing a μ-V positive inclination characteristic of the friction material of the embodiment and that of the conventional material.
Figure 4:
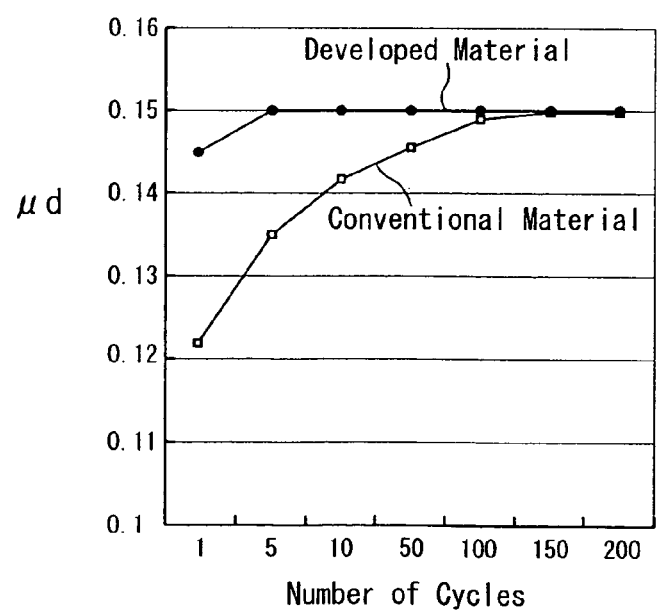
FIG. 4 is a graph comparing an initial property of the friction material of the embodiment and that of the conventional material.

FIG. 1 is a graph showing a distribution of a resin amount in a thickness direction of a lining portion of a friction material unit according to an embodiment and its modifications of the invention. FIG. 2 is a graph comparing a heat spot resistance of the friction material according to the embodiment of the invention and that of a conventional material. FIG. 3 is a graph comparing a μ-V positive inclination characteristic of the friction material of the embodiment and that of the conventional material. FIG. 4 is a graph comparing an initial property of the friction material of the embodiment and that of the conventional material.

A friction material as a raw material of a friction material unit according to the present embodiment is a resin impregnated friction material. The present embodiment of the friction material can be manufactured by a variety of manufacturing methods.

For example, a first manufacturing method of the present embodiment of the friction material has a drying step of the friction material. In the drying step, a temperature at a friction surface of the friction material is kept low, while a temperature of an opposite surface (non-friction surface) being kept high. A resin in the friction material has a characteristic or tends to move from a low temperature portion to a high temperature portion by trailing behind a solvent that moves to the high temperature portion so as to be dried. Therefore, a distribution of a resin amount in a thickness direction is the highest at a portion near the non-friction surface while being the lowest at a portion near the friction surface.

According to a second manufacturing method of the present embodiment of the friction material, friction surfaces of two friction materials are faced and overlapped with each other and naturally dried thereafter for twenty-four hours or more as they are. Then, the dried two pieces of the friction materials are cured or hardened at a high temperature while being separated from each other or being kept overlapped as they are. In this case, the solvent does not dry from the faced friction surfaces of the two friction materials but dries from the non-friction surfaces that are disposed outside. Consequently, the distribution of the resin amount in the thickness direction is the highest at the portion near the non-friction surface while being the lowest at the portion near the friction surface, as in the first manufacturing method.

FIG. 1 show respectively the distribution of the resin amount in the thickness direction in the friction materials "Aa" and "Ab" made by the first and the second manufacturing methods. As shown in FIG. 1, in the friction materials "Aa" and "Ab", the distribution of the resin amount in the thickness direction is the highest at the portion near the non-friction surface. The distribution of the resin amount decreases as it goes towards inside. Then, the distribution of the resin amount is the lowest at the portion near the friction surface. The friction material having such distribution of the resin amount has an excellent property as the friction material starting with a heat spot resistance mentioned below.

In a first modification "B" of a friction material of the present embodiment, the distribution of the resin amount is not the lowest at the portion near the friction surface. However, the distribution of the resin amount is lower at the portion near the friction surface than the other portion such as the portion near the non-friction surface. In a second and a third modifications "C" and "D" of friction materials of the present embodiment, the distribution of the resin amount is lower at the portion near the friction surface, though the distribution is not so smooth as seen in the distribution in the embodiments "Aa" and "Ab". In those cases, the friction materials show excellent heat spot resistance, too.

Next, a test for a heat spot resistance was carried out for a specific example of a friction material according to the present embodiment of the invention and a conventional friction material as a comparison example. The specific example of the friction material was manufactured as follows. First, two of the above described friction materials according to the embodiment or modifications were overlapped on each other while the friction surfaces are face with each other. Then, the two friction materials were naturally dried for twenty-four hours or more while they are kept overlapped. Thereafter, the resin in the friction materials was completely hardened at a temperature of 200° C. for one hour. Then, the friction materials were stuck to a core metal on which an adhesive was coated so as to obtain the friction material of the specific example. Thereafter, the heat spot resistance test was carried out on the specific example of the friction material according to the present embodiment and the comparison example of the conventional friction material. The heat spot resistance test is a test in which a friction material is pressingly fitted to an iron material and rotated while it is measured how many times the friction material rotates until a scorch (heat spot) is generated first on a surface of the iron material. Thus, the heat resistance of the friction material is evaluated.

As a test machine, SAE#2 tester was used. The evaluation was carried out under a condition of a rotating speed of 7800 rpm, an inertia amount of 0.086 kg·m2, a face pressure of 785 kPa and an oil amount of 180 ml/min. A test result is shown in FIG. 2. It is seen that the heat spot resistance of the present embodiment of the friction material improves up to almost fifteen times as large as that of the conventional friction material.

Next, a μ-V positive inclination characteristic was tested on the present embodiment of the friction material while compared with the conventional friction material. A test result is shown in FIG. 3. No μ-V positive inclination characteristic was confirmed on the conventional friction material. On the other hand, an outstanding μ-V positive inclination characteristic is confirmed on the present embodiment of the friction material. Thus, since the resin amount at the portion near the friction surface is low in the friction material according to the present embodiment, an actual driving feeling improves such as a clutch property or a μ-V positive inclination characteristic.

Next, an initial property was tested on the present embodiment of the friction material while compared with the conventional friction material. A test result is shown in FIG. 4. It is well seen that the present embodiment of the friction material improves in the initial property far better than the conventional friction material. Thus, since the resin amount at the portion near the friction surface is low in the friction material according to the present embodiment, the initial property improves. Therefore, it is possible to stabilize a performance of an AT (automatic transmission) from an initial stage.

As described above, in the present embodiment of the friction material, the distribution of the resin amount in the thickness direction at a lining portion is lower at the portion near the friction surface than at a portion that has a highest distribution of a resin amount. For example, in the resin impregnated friction material, the drying is carried out so as to make low the temperature at the friction surface of the friction material and make high the temperature at the non-friction surface. Thus, the distribution of the resin amount in the thickness direction of the lining portion of the friction material unit becomes lower at the portion near the friction surface than at the portion that has the highest distribution of the resin amount. That is, the resin amount at the portion near the friction surface is lower than the inside of the friction material or the portion near the non-friction surface. Consequently, the heat resistance and the heat spot resistance improves very much. Thus, the present embodiment of the friction material becomes ultra-high heat resistant.

Moreover, the distribution of the resin amount in the thickness direction of the friction material is determined by the drying step of the friction material. Then, it is unnecessary to carry out a post-treatment process. Consequently, it is possible to provide a friction material of ultra-high heat resistance at low costs without any deterioration of the strength. Furthermore, since the resin amount near the friction surface is less, the clutch property, the μ-V positive inclination characteristic and the actual driving feeling improve. In addition, since the resin amount near the friction surface is less, the initial property improves. Therefore, the performance of the AT is made stable from the initial stage.

The "portion near the friction surface" means a portion or a range that has a depth of about 10% from the friction surface in relation to the overall thickness of the friction material. Moreover, a "resin rate" is defined to mean a "resin amount per a unit volume". Thus, it can be defined that, in the present embodiment of the friction material, an average resin rate within the range having a depth of about 10% from the friction surface in relation to the overall thickness of the friction material is lower than an average resin rate of the entire friction material. The same results are obtained if it is defined that an average resin rate within a range having a depth of about 5% from the friction surface in relation to the overall thickness of the friction material is lower than the average resin rate of the entire friction material. According to experiments of the inventors of the present application, it was confirmed that an average resin rate within a range having a depth of about 40% from the friction surface in relation to the overall thickness of the friction material is lower than the average resin rate of the entire friction material. However, as judged from a property shown in FIG. 1, it is estimated that an average resin rate within a range having a depth a little larger than about 40% from the friction surface in relation to the overall thickness of the friction material is lower than the average resin rate of the entire friction material.

In the present embodiment of the friction material unit, the friction materials shown by "Aa", "Ab", "C" and "D" of FIG. 1 have the lowest resin amount distribution in the thickness direction at the portions near the friction surfaces, respectively. The above-mentioned effects are obtained if the resin amount distribution in the thickness direction of the lining portion of the friction material is such that there exist at the portion near the friction surface a portion having a high resin amount and a portion having a low resin amount or portions having resin rate of about plus 3% or more or minus 3% or less in relation to the average resin rate. Particularly, the above-mentioned effects are obtained if the resin amount distribution in the thickness direction of the lining portion of the friction material is such that there exist at the portion near the friction surface a portion having a low resin amount or a resin rate less than about minus 3% in relation to the average resin rate.

Moreover, according to test results of the inventors, the present embodiment of the friction material can be specified as a friction material that has an average resin rate of 0% to 50% at the portion near the friction surface and that has a lower average resin rate than the average resin rate of the entire friction material. In this case, it is though that the same advantageous effects are also obtained.

Particularly, if the resin amount distribution in the thickness direction of the lining portion of the friction material is the lowest at the portion near the friction surface, the friction material can have an extremely high heat resistance and hear spot resistance so as to be ultrahigh heat resistant. Moreover, the resin amount distribution in the thickness direction of the friction material is determined by the drying step of the friction material. Therefore, no post-treatment process is necessary. Consequently, the friction material can be manufactured at low costs and no deterioration of strength is caused thereto. Furthermore, even if a compounding rate or mixing amount of the resin of the friction material is increased in order to heighten the strength, the resin amount near the friction surface becomes less than the convention one. Consequently, it is possible to heighten the strength without affecting the heat resistance.

The manufacturing method of the friction material according to the present embodiment includes a step for keeping low the temperature at the friction surface while keeping high the temperature at the non-friction surface in the drying step of the friction material. Therefore, the resin in the friction material has such a property as moving from the low temperature part to the high temperature part while being led by the solvent that moves to the high temperature part and that is dried thereafter. Consequently, the resin amount distribution in the thickness direction becomes the lowest at the portion near the friction surface. Accordingly, the friction material can be ultrahigh heat resistant while having the above-mentioned excellent characteristics. Moreover, the present embodiment of the manufacturing method forms a preferable resin amount distribution in the drying step that is seen in the conventional art. Thus, it is unnecessary to add special steps, so that the present embodiment of the manufacture method can be practiced at low costs.

Particularly, the present embodiment has the step of drying naturally or at a room temperature the two friction materials that are overlapped on each other while faced at their friction surfaces (First Method). The property tests were carried out on the friction materials manufactured by such step. However, the property is improved similarly also in case of the friction material that is manufactured by decreasing the resin amount near the friction surface by making low the temperature at the friction surface while making high the temperature at the non-friction surface in the drying step of the friction material (Second Method).

The method for decreasing the resin amount near the friction surface is not limited to the above two methods. A variety of other methods can be adopted such as a depressurization, a pressurization, a centrifugal separation, a one-side coating by a spray coating, a lip coating and a roller coating or the like, etc. Moreover, while the present embodiment has been described on the resin impregnated friction material, the friction material of the invention is not limited to the resin impregnated one. The invention can be embodied into any type of friction materials as long as it contains a resin as a component starting with a resin layered type.

Particularly, in case of using a powder resin, the inventive friction material can be similarly manufactured also by a step for mixing and kneading the powder resin so as to be evenly distributed when forming the friction material and making low the temperature at the friction surface while making high the temperature at the non-friction surface in the drying step of the friction material. Moreover, in the drying step of the friction material having such even distribution, the power resin may be spread or dispersed on one face of the friction material. Alternatively, the powder resin may be stuck to the one face of the friction material so as to be impregnated therein.

The invention is not limited to the above embodiment with respect to the other structure, shape, number, material, dimension, relative connection or the like. The invention is not limited to the above embodiment with respect to the manufacturing method of the friction material or the other steps.

Normally, the manufacturing method according to the above embodiment of the friction material includes the step of making low the temperature at the one surface and/or making high the temperature at the other surface in the drying step of the friction material. Then, the resin in the friction material has a characteristic such that it moves from the low temperature part to the high temperature part by being led or dragged by the solvent that moves toward the high temperature part to be dried. Consequently, the resin amount distribution in the thickness direction becomes the lowest at the portion near the one surface. Accordingly, the friction material becomes ultrahigh heat resistant while having the above described excellent characteristics. Moreover, the present embodiment of the manufacturing method forms the preferable resin amount distribution in the conventional drying step. Therefore, additional steps are unnecessary and it can be practiced at low costs.

The above embodiment of the manufacturing method of the friction material includes the step for drying the two friction materials overlapped with the friction surfaces faced with each other and thereafter hardening the friction materials while separating them or keeping them overlapped. In this case, the solvent does not dry from the faced friction surfaces but dries from the non-friction surface disposed outside. Therefore, the resin in the friction material moves while being led by the solvent so that the resin amount distribution in the thickness direction becomes the highest at the portion near the non-friction surface and the lowest at the portion near the friction surface. Accordingly, the friction material becomes the ultrahigh heat resistant and has the above excellent characteristics. Moreover, the present embodiment of the manufacturing method forms the preferable resin amount distribution in the conventional drying step. Therefore, additional steps are unnecessary and it can be practiced at low costs.

The above-mentioned manufacturing method of the friction material makes two or more friction materials having different resin amounts overlapped and joined as one body. Specifically, two or more friction materials having different resin amounts are formed first. Then, the friction materials are overlapped on each other in an appropriately dried state before finishing drying while using at least one or more friction materials having a different resin amount. Then, the friction materials are stuck to each other via a binder so as to make one body. Thus, the resin amount distribution in the thickness direction becomes the highest at the portion near the non-friction material and the lowest at the portion near the friction material. Consequently, the friction material becomes ultrahigh heat resistant. That is, a friction material can be dried while making the resin amount less at the portion near the friction surface and mounted on another friction material before drying so as to be integrally joined. As a result, the resin amount distribution in the thickness direction from the friction surface side to the non-friction surface side of the friction material becomes lower at the portion near the friction surface than at the portion having the highest resin amount in the thickness direction. Moreover, it is possible that plural friction materials be overlapped and the resin impregnated therein so as to form a friction material having a non-continuous distribution between the faces of plural friction materials.

As described above, the friction material according to the invention has the resin material distribution in the thickness direction of the lining portion, namely, in the thickness direction from the friction surface side to the non-friction surface side. The distribution is lower at the portion near the friction surface than at the portion having the highest resin amount in the thickness direction. In embodying the invention, the friction surface and the non-friction surface or the front and the rear surfaces of the friction materials that are dried appropriately in the drying step are joined by the binder. Thus, it is possible to make the resin amount distribution in the thickness direction from the friction surface side to the non-friction surface side of the friction material lower at the portion near the friction surface than at the portion having the highest resin amount. In this case, no post-treatment process is necessary. Consequently, the friction material of ultrahigh heat resistance can be obtained at low costs without deterioration of the strength.

As described above, the resin amount distribution in the thickness direction from the friction surface side to the non-friction surface side of the friction material is made lower at the portion near the friction surface than at the portion having the highest resin amount. Consequently, the friction material improves its heat resistance and heat spot resistance so as to be ultrahigh heat resistant. Moreover, the resin amount distribution in the thickness direction is determined in the drying step of the friction material. Accordingly, no post-treatment process is necessary. Consequently, the friction material can be ultrahigh heat resistant at low costs without deterioration of strength.

The resin of the above embodiment of the friction material is 20% or more lower at the friction surface side than at the non-friction surface side in the embodiment of the "Aa" of FIG. 1. Therefore, the resin amount near the friction surface becomes lower than that near the non-friction surface. Thus, the heat resistance and the heat spot resistance improve very much, so that the friction material becomes ultrahigh heat resistant. However, according to the experiments of the inventors, even if the resin amount is 5% or more lower at the friction surface side than at the non-friction surface side, it was confirmed that the heat resistance and the heat spot resistance improved and that the property as the ultrahigh heat resistant friction material improved. As a result, it was revealed that it was enough if the resin amount distribution in the thickness direction from the friction surface side to the non-friction surface side of the friction material was made lower at the portion near the friction surface than at the portion having the highest resin amount in the thickness direction.

Particularly, in the above embodiment of the friction material, the resin amount is made about 5% or more lower at the friction surface side than at the inside of the friction material. Since the resin amount is lower at the portion near the friction surface than at the inside of the friction material. Consequently, the friction material is improved very much in the heat resistance and the heat spot resistance in the same manner as the embodiment in which the resin amount is lower at the portion near the friction surface than at the portion near the non-friction surface. As a result, the friction material becomes ultrahigh heat resistant. Moreover, the resin amount distribution in the thickness direction is determined in the drying step of the friction material. Accordingly, no post-treatment process is necessary. Consequently, the friction material can be ultrahigh heat resistant at low costs without deterioration of strength.

In the above embodiment, as shown in FIG. 1, the resin amount distribution in the friction material is continuously changed. Therefore, it is prevented that a mechanical stress is applied to a specific portion.

Moreover, in the above embodiment, as shown in FIG. 1, the friction material that changes the resin amount distribution continuously can be manufactured as follows. That is, two or three or more friction materials having different resin amounts are formed first. Then, the friction materials are overlapped on each other in an appropriately dried state before finishing drying while using at least one or more friction materials having a different resin amount. Then, the friction materials having the different resin amounts are stuck to each other via a binder so as to make one body.

In this case, the friction material changes the resin amount distribution in a discontinuous manner. However, it is possible to set a resin content rate as desired in the plural friction materials having the different resin amounts. Consequently, the friction material is improved very much in the heat resistance and the heat spot resistance and becomes ultrahigh heat resistant. Moreover, the resin amount distribution in the thickness direction can be determined by the overlapping. As a result, it is possible to obtain the ultrahigh heat resistant friction material at desired low costs.

The above embodiment of the friction material is formed by impregnation of the resin. That is, the temperature at the friction surface of the friction material is decreased while the temperature at the non-friction surface being increased after the resin is impregnated therein. Then, the resin in the friction material has such a property as to move from the low temperature portion to the high temperature portion while being led by the solvent that moves toward the high temperature portion and that is dried thereafter. Consequently, the resin amount distribution in the thickness direction becomes the highest at the portion near the non-friction surface and the lowest at the portion near the friction surface. Therefore, the friction material can be easily manufactured at low costs.

According to the experiments of the inventors, with respect to the resin amount distribution in the thickness direction of the above embodiment of the friction material, if the resin amount is about 1% lower at the portion near the friction surface than the average resin rate, the resin amount becomes lower at the portion near the friction surface than the inside of the friction material or the portion near the non-friction surface. Thus, the friction material is very much improved in the heat resistance and the heat spot resistance so as to be ultrahigh heat resistant. Moreover, the friction material can be ultrahigh heat resistant at low costs without any deterioration of strength.

The present embodiment of the manufacturing method of the friction material can be practiced such that it includes the step for making low the temperature of the one surface and/or making high the temperature of the other surface in the drying step of the friction material. The resin in the friction material has such a characteristic as to move from the low temperature part to the high temperature part while dragged by the solvent moving toward the high temperature portion so as to be dried. Then, the resin amount distribution in the thickness direction becomes the lowest at the portion near the one surface. Accordingly, the friction material becomes ultrahigh heat resistance while having the above excellent characteristics. Moreover, the present embodiment of the manufacturing method forms the preferable resin amount distribution in the conventional drying step. Consequently, no additional steps are necessary. As a result, it can be practiced at low costs.

The present embodiment of the manufacturing method of the friction material includes the steps for drying two friction materials or two or more friction materials with the friction surfaces thereof overlapped with each other and then hardening the friction materials at a high temperature while separating them or keeping them overlapped. In this case, the solvent does not dry from the friction surface faced and confronted to each other but dries from the non-friction surface that is located outside. Therefore, the resin in the friction material moves while dragged by the solvent. Thus, the resin amount distribution in the thickness direction becomes the highest at the portion near the non-friction surface and the lowest at the portion near the friction surface. Moreover, the present embodiment of the manufacturing method forms the preferable resin amount distribution in the conventional drying step. Consequently, no additional steps are necessary. As a result, it can be practiced at low costs.

The present embodiment of the manufacturing method of the friction material includes the steps for additionally impregnating the resin into one surface of the friction material in the step of impregnating the resin in the friction material, disposing the side, to which the resin is additionally impregnated, of the friction materials toward outside and drying the friction materials at a predetermined temperature condition while giving a centrifugal force in its thickness direction. Consequently, it is possible to make the resin amount distribution in the thickness direction from the friction surface side to the non-friction surface side at the side to which the resin is additionally impregnated lower at the portion near the friction surface than at the portion having the highest resin amount in the thickness direction.

Figure 5:
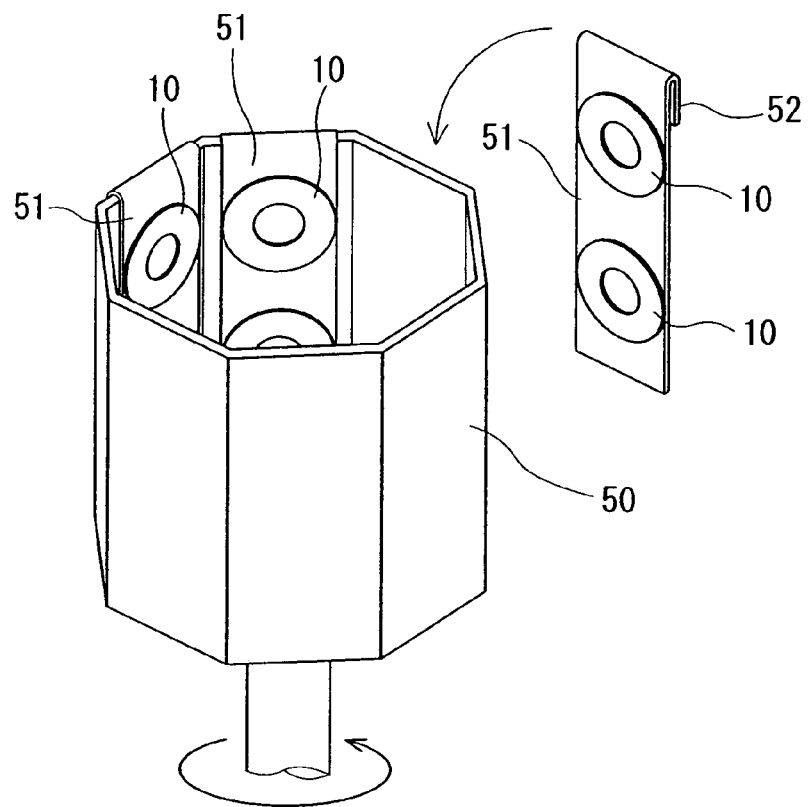
FIG. 5 is an explanatory drawing showing a specific example of the manufacturing method of the friction material according to the embodiment of the invention.

FIG. 5 is an explanatory drawing showing a specific example of the manufacturing method of the friction material according to the embodiment of the invention.

In the present embodiment of the manufacturing method of the friction material, a friction material 10 is impregnated with a resin. Next, in a drying step of the friction material 10, the friction material 10 is disposed on a support 51. Then, the support 51 is mounted on a rotation drum 50 via an engagement means 52. Thereafter, the rotation drum 50 is rotated to give a centrifugal force to the friction material 10 in the thickness direction. At the same time, the friction material 10 is dried at a predetermined temperature condition. Therefore, the resin amount distribution in the thickness direction from the friction surface side to the non-friction surface side of the friction material 10 can be made lower as desired at the portion near the friction surface than at the portion having the highest resin amount in the thickness direction depending on the temperature condition and the centrifugal force. Alternatively, the drying step of the friction material 10 may include a step for drying the friction material 10 at a predetermined temperature condition while making a side having a larger viscosity resin of the friction material 10 disposed outside and giving a centrifugal force thereto in the thickness direction. In this case, the resin amount distribution in the thickness direction from the friction surface side to the non-friction surface side of the friction material 10 can be made lower as desired at the portion near the friction surface than at the portion having the highest resin amount in the thickness direction depending on the viscosity condition, the temperature condition and the centrifugal force in the front and the rear sides of the friction material.

While the above embodiments are described on the premise that the friction material is two-dimensionally processed, the three-dimensional process is possible as shown in FIG. 5.

Figure 6:
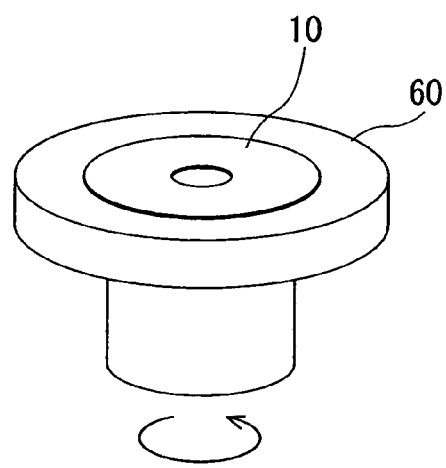
FIG. 6 is an explanatory drawing showing another specific example of the manufacturing method of the friction material according to the embodiment of the invention.

FIG. 6 is an explanatory drawing showing another specific example of the manufacturing method of the friction material according to the embodiment of the invention.

Specifically, the friction material 10 is disposed on a center of a rotation bed 60 that rotates at a predetermined rotation speed at the time of drying the friction material 10 at a predetermined temperature condition. Thus, the resin amount distribution at a peripheral portion of the friction material 10 becomes high by a centrifugal force thereof. Accordingly, in addition to the above-mentioned embodiments, the resin amount distribution becomes high at the peripheral portion of the friction material 10. Consequently, it is possible to obtain a mechanical strength in such a direction as to enlarge a couple of force corresponding to a load. As a result, the friction material has a stable strength.

That is, when the friction material 10 is cut along a diameter that is the largest length thereof, the resin amount distribution changes two-dimensionally in a width direction and a thickness direction in its cross-section. For example, in the embodiment of FIG. 6, such two-dimensional change in the resin amount distribution means that the resin amount distribution is made higher at the outer peripheral portion than the central portion. Moreover, the resin amount distribution change can be obtained as desired according to the thickness of the friction material 10, the centrifugal force, the temperature and the resin viscosity.

The preferred embodiments described herein are illustrative and not restrictive, the scope of the invention being indicated in the appended claims and all variations which come within the meaning of the claims are intended to be embraced therein.

The invention claimed is:

1. A manufacturing method of a friction material comprising the steps of:
   making a resin contained in at least two friction materials, the at least two friction materials having a friction surface and a non-friction surface respectively; and
   drying the at least two friction materials;
   wherein the drying step includes steps for drying the at least two friction materials with the friction surfaces thereof overlapped with each other and then hardening the at least two friction materials at a high temperature while separating the at least two friction materials.

2. A manufacturing method of a friction material according to claim 1, in which the drying step further includes a step for rotating the friction material in drying at a predetermined temperature condition so as to make a distribution of an amount of the resin higher at an outer peripheral portion of the friction material by a centrifugal force in rotating.

3. A manufacturing method of a friction material comprising the steps of:
   making a resin contained in each of at least two friction materials while the at least two friction materials are separated from each other, the at least two friction materials having a friction surface and a non-friction surface respectively; and
   drying the at least two friction materials;
   wherein the drying step includes steps for overlapping the at least two friction materials with each other after the resin containing step and drying the at least two friction materials with friction surfaces thereof overlapped with each other and then hardening the at least two friction materials at a high temperature while separating the at least two friction materials or keeping the at least two friction materials overlapped.

* * * * *